United States Patent
Nagahara

(10) Patent No.: US 8,911,913 B2
(45) Date of Patent: Dec. 16, 2014

(54) FUEL CELL SYSTEM AND METHOD FOR RECOVERING PERFORMANCE OF A FUEL CELL

(75) Inventor: Yoshiki Nagahara, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 730 days.

(21) Appl. No.: 13/055,319

(22) PCT Filed: Aug. 5, 2009

(86) PCT No.: PCT/IB2009/006469
§ 371 (c)(1),
(2), (4) Date: Jan. 21, 2011

(87) PCT Pub. No.: WO2010/015920
PCT Pub. Date: Feb. 11, 2010

(65) Prior Publication Data
US 2011/0129751 A1    Jun. 2, 2011

(30) Foreign Application Priority Data
Aug. 7, 2008 (JP) .................................. 2008-204390

(51) Int. Cl.
H01M 8/04 (2006.01)
H01M 8/10 (2006.01)

(52) U.S. Cl.
CPC ........ H01M 8/0432 (2013.01); H01M 8/04552 (2013.01); H01M 8/04701 (2013.01); H01M 8/04835 (2013.01); H01M 8/04873 (2013.01); H01M 8/04932 (2013.01); H01M 2008/1095 (2013.01); Y02E 60/50 (2013.01)
USPC ............................ 429/432; 429/442; 429/428

(58) Field of Classification Search
USPC .................................................. 429/428–442
See application file for complete search history.

(56) References Cited

U.S. PATENT DOCUMENTS

| | | | |
|---|---|---|---|
| 2003/0022042 A1* | 1/2003 | Wells et al. | 429/23 |
| 2004/0137292 A1 | 7/2004 | Takebe et al. | |
| 2010/0203407 A1* | 8/2010 | Iden et al. | 429/429 |

FOREIGN PATENT DOCUMENTS

| | | |
|---|---|---|
| CN | 1992412 | 7/2007 |
| JP | 9-27327 | 1/1997 |
| JP | 2007-103023 | 4/2007 |
| JP | 2007-207669 | 8/2007 |
| JP | 2007-207671 | 8/2007 |
| JP | 2008-077884 | 4/2008 |
| JP | 2008-235093 | 10/2008 |
| JP | 2009-146876 | 7/2009 |

* cited by examiner

Primary Examiner — Kenneth Douyette
Assistant Examiner — James Lee
(74) Attorney, Agent, or Firm — Drinker Biddle & Reath LLP

(57) ABSTRACT

A fuel cell system is provided having at least one fuel cell including an oxidant electrode, a fuel electrode, and an electrolyte membrane interposed between the oxidant electrode and the fuel electrode. The fuel cell system includes a temperature detector which detects a temperature of the fuel cell and a controller which operates the fuel cell, controls a potential of the oxidant electrode, and determines whether to perform a performance recovery operation in which an impurity on the oxidant electrode is oxidized. When the performance recovery operation is to be performed, the controller controls the potential of the oxidant electrode to be a desired potential based on the temperature detected by the temperature detector.

12 Claims, 7 Drawing Sheets

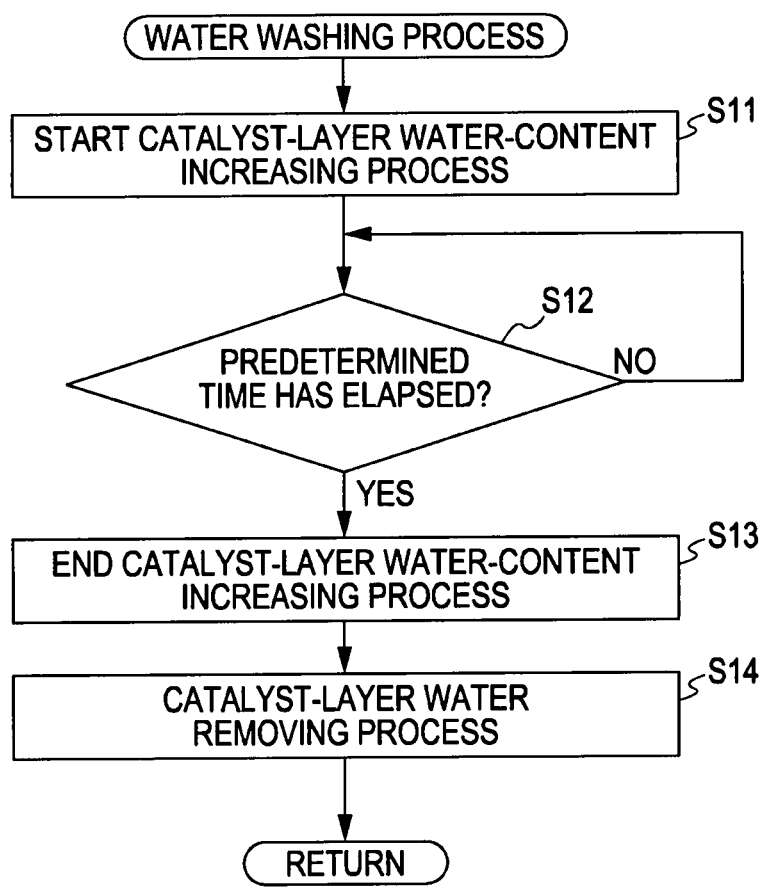

US 8,911,913 B2

FUEL CELL SYSTEM AND METHOD FOR RECOVERING PERFORMANCE OF A FUEL CELL

CROSS-REFERENCE TO RELATED APPLICATIONS

This application claims priority to Japanese Patent Application No. 2008-204390 filed Aug. 7, 2008, which is incorporated by reference herein in its entirety.

BACKGROUND OF THE INVENTION

1. Field of the Invention

The present invention relates to a fuel cell system and a method for recovering performance of a fuel cell.

2. Description of the Related Art

If a fuel cell is operated for a long time, various impurities will be adsorbed on an electrode of the fuel cell and power generation performance thereof will be reduced. According to a known method for recovering the performance of the electrode on which the impurities are adsorbed, a potential of the electrode is increased so that the impurities, such as sulfur, adsorbed on the electrode are oxidized and are thereby removed. See, for example, Japanese Unexamined Patent Application Publication No. 2008-077884.

According to the above-described method, the fuel cell is maintained in a high-potential state so as to oxidize sulfur species adsorbed on a catalyst surface. However, if the fuel cell is maintained in a state in which the electrode potential is at a no-load potential or a high potential close to the no-load potential, there is a risk that an electrolyte membrane of the fuel cell will be degraded or elution of the catalyst metal will occur.

SUMMARY OF THE INVENTION

An object of the present invention is to provide a fuel cell system and a method for recovering performance of a fuel cell by oxidizing materials adsorbed on the electrode at such a potential that problems of degradation of an electrolyte membrane of the fuel cell and elution of catalyst metal can be prevented.

In one embodiment of the invention, a fuel cell system is provided having at least one fuel cell including an oxidant electrode, a fuel electrode, and an electrolyte membrane interposed between the oxidant electrode and the fuel electrode. The fuel cell system includes a temperature detector which detects a temperature of the fuel cell and a controller which operates the fuel cell, controls a potential of the oxidant electrode, and determines whether to perform a performance recovery operation in which an impurity on the oxidant electrode is oxidized. When the performance recovery operation is to be performed, the controller operates the fuel cell while controlling the potential of the oxidant electrode to be a desired potential based on the temperature detected by the temperature detector.

In another embodiment of the invention, a method for recovering performance of a fuel cell is provided, the fuel cell including an oxidant electrode, a fuel electrode, and an electrolyte membrane interposed between the oxidant electrode and the fuel electrode. The method includes determining whether performance recovery is to be performed, detecting a temperature of the fuel cell, setting a potential of the oxidant electrode to be a desired potential based on the detected temperature of the fuel cell, and operating the fuel cell with the oxidant electrode at the desired potential to oxidize an impurity on the oxidant electrode.

In another embodiment of the invention, a fuel cell system is provided having at least one fuel cell including an oxidant electrode, a fuel electrode, and an electrolyte membrane interposed between the oxidant electrode and the fuel electrode. The fuel cell system includes temperature detecting means which detects a temperature of the fuel cell, control means which operates the fuel cell and controls a potential of the oxidant electrode, and determining means which determines whether to perform a performance recovery operation in which an impurity on the oxidant electrode is oxidized. When the performance recovery operation is to be performed, the control means operates the fuel cell while controlling the potential of the oxidant electrode to be a desired potential based on the temperature detected by the temperature detector.

Therefore, according to the present invention, the performance can be recovered without setting an electrode potential of the fuel cell to a high potential which leads to the problems of degradation of the electrolyte membrane and elution of the catalyst metal when the impurities adsorbed on the electrode and accumulated in the fuel cell are removed by oxidizing the impurities.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

FIG. 7 is a flowchart illustrating the process of increasing the amount of water in a catalyst layer.

DESCRIPTION OF THE PREFERRED EMBODIMENTS

An embodiment of the present invention is described below with reference to the drawings.

Figure 1:
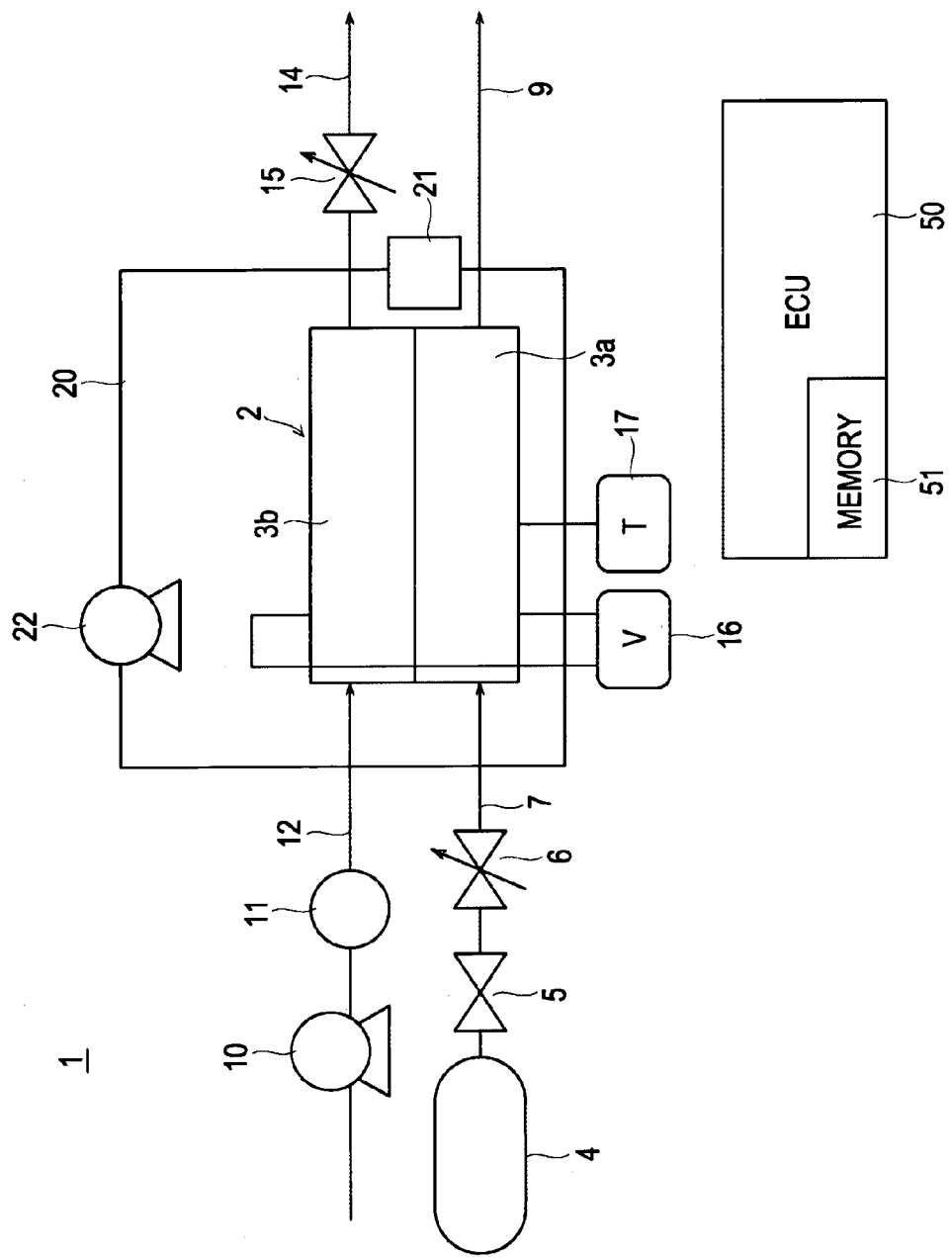
FIG. 1 is a diagram illustrating the structure of a fuel cell system according to an embodiment of the present invention.
Figure 2:
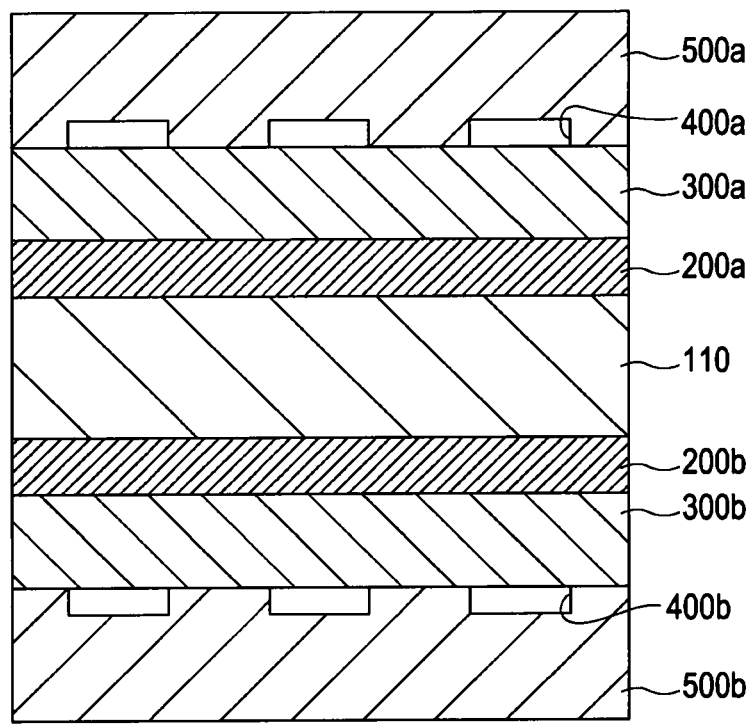
FIG. 2 is a sectional view illustrating the structure of a power generation cell included in the fuel cell.

FIG. 1 is a diagram illustrating the structure of a fuel cell system 1 according to the embodiment of the present invention. FIG. 2 is a sectional view illustrating the structure of a power generation cell included in the fuel cell.

The fuel cell system 1 includes a fuel cell stack 2 in which a plurality of fuel-cell structures (fuel-cell elements) are stacked such that each fuel-cell structure is sandwiched between separators. Each of the fuel cell structures includes an oxidant electrode 3b and a fuel electrode 3a which face each other with a solid polymer electrolyte membrane interposed therebetween. The inner structure of the fuel cell stack 2 will be described below.

The fuel cell stack 2 is connected to a fuel-gas supply pipe 7 through which fuel gas is supplied to the fuel electrode 3a, and is also connected to an oxidant-gas supply pipe 12 through which oxidant gas is supplied to the oxidant electrode 3b. The fuel-gas supply pipe 7 is connected to a fuel tank (for example, high-pressure hydrogen tank) 4 for supplying hydrogen gas to the fuel electrode 3a. The fuel tank 4 and the fuel-gas supply pipe 7 serve as a fuel-gas supply means.

The oxidant-gas supply pipe 12 is connected to a compressor 10, and the compressor 10 and the oxidant-gas supply pipe 12 serve as oxidant-gas supply means. In FIG. 1, a single fuel electrode and a single oxidant electrode are denoted by 3a and 3b, respectively, for convenience. However, in practice, the fuel cell stack 2 includes a plurality of power generation cells which are stacked on top of each other, and each power generation cell includes the fuel electrode 3a and the oxidant electrode 3b.

Hydrogen, which serves as the fuel gas, is supplied from the fuel tank 4 to the fuel electrode 3a of the fuel cell stack 2 through the fuel-gas supply pipe 7. More specifically, a fuel supply valve 5 is provided in the fuel-gas supply pipe 7 at a position downstream of the fuel tank 4. When the fuel supply valve 5 is opened, high-pressure hydrogen gas is supplied from the fuel tank 4 to the fuel cell stack 2 after the pressure of the hydrogen gas is reduced by a fuel pressure regulator 6. The thus-supplied hydrogen gas flows into gas passages (grooves) 400a in each power generation cell in the fuel cell stack 2. A pressure reducer (not shown) may be additionally provided in the fuel-gas supply pipe 7 as necessary.

The open/close state of the fuel pressure regulator 6 is controlled by an electrical control unit (ECU) 50, which serves as control means. The valve opening rate of the fuel pressure regulator 6 is controlled by the ECU 50 such that the pressure of hydrogen supplied to the fuel cell stack 2 is at a desired pressure. The exhaust gas (gas containing unused hydrogen) discharged from the fuel electrode 3a of the fuel cell stack 2 is guided to a hydrogen discharge pipe 9.

Air (for example, atmospheric air) is used as oxidant gas. The air is sucked into the compressor 10, is compressed by the compressor 10, and is supplied to the oxidant electrode 3b of the fuel cell stack 2 through the oxidant-gas supply pipe 12. The thus-supplied air flows into gas passages (grooves) 400b in each power generation cell in the fuel cell stack 2. The unused air is discharged from the oxidant electrode 3b of the fuel cell stack 2 to the outside (atmosphere) through an air discharge pipe 14 after a part of the oxygen contained in the air is consumed. An air pressure regulator 15 is provided in the air discharge pipe 14. The ECU 50 controls the valve opening rate of the air pressure regulator 15 and the drive level (rotational speed) of the compressor 10 so that the pressure and the flow rate of the air supplied to the fuel cell stack 2 are set to desired values.

The fuel cell stack 2 is surrounded by a cooling device (cooling means) for cooling the fuel cell stack 2, the temperature of which is heated to a high temperature in a power generation operation. In the present embodiment, a coolant circulation system is provided as the cooling device. The coolant circulation system includes a coolant pipe 20 which extends around the fuel cell stack 2, a coolant tank 21 which contains coolant, and a pump 22 for circulating the coolant. The coolant may be, for example, water or antifreeze. Thus, according to the present embodiment, the cooling device is a water-cooling device.

According to the present embodiment, the fuel cell stack 2 has an inner structure in which a plurality of power generation cells (fuel-cell elements) are stacked on top of each other. As shown in FIG. 2, for example, a single power generation cell includes at least a fuel electrode to which fuel gas is supplied, an oxidant electrode to which oxidant gas is supplied, electrolyte interposed between the fuel electrode and the oxidant electrode, and catalyst layers interposed between the fuel electrode and the oxidant electrode. More specifically, a polymer electrolyte membrane 110 is disposed at the center. A fuel-electrode catalyst layer 200a, a fuel-electrode gas diffusion layer 300a, and a fuel-electrode separator 500a having the fuel-gas supply grooves 400a formed therein are provided on one side of the polymer electrolyte membrane 110. An oxidant-electrode catalyst layer 200b, an oxidant-electrode gas diffusion layer 300b, and an oxidant-electrode separator 500b having the oxidant-gas supply grooves 400b formed therein are provided on the other side of the polymer electrolyte membrane 110. The fuel cell stack 2 includes a plurality of power generation cells having the above-described structure.

The fuel gas and the oxidant gas are respectively supplied to the fuel-electrode catalyst layer 200a and the oxidant-electrode catalyst layer 200b through the gas passages (grooves) 400a and 400b formed in the separators 500a and 500b.

Although not shown in the figure, a gasket, a gas seal, or the like is provided on the fuel cell stack 2 as an edge seal member at the outer peripheral sections between the electrolyte membrane and the separators so that the gases can be prevented from leaking to the outside.

In the above-described fuel cell system 1, the hydrogen gas and the air are supplied to the fuel cell stack 2. Accordingly, power is generated in each power generation cell, and water is produced on the oxidant electrode 3b as a product of the reaction between the fuel gas and the oxidant gas. The thus-produced water flows from the oxidant-electrode catalyst layer 200b to the fuel-electrode catalyst layer 200a through the polymer electrolyte membrane 110, which is maintained in the wet state.

The ECU 50 has a function of controlling the overall operation of the system, and also controls a characteristic recovery operation for removing impurities adsorbed on the electrodes. The ECU 50 performs the above-mentioned control operations by executing control programs corresponding to control sequences described below and controlling the components of the system in accordance with the control programs. In the figures, signal lines connecting the ECU 50 to the components to be controlled are not shown.

The ECU 50 includes a memory 51 which serves as storage means for storing the relationship between the temperature, the potential, and the operation time necessary for oxidizing the impurities in the characteristic recovery operation.

According to the present embodiment, a process for washing (water washing) the oxidized impurities is also performed. The water washing process is also controlled by the ECU 50. In the present embodiment, the water washing process is performed by controlling the amount of water produced by the reaction between the fuel gas and the oxidant gas in the catalyst layers. The amount of water in the catalyst layers is controlled by adjusting the flow rate of the air supplied to the fuel cell by changing the rotational speed of the compressor 10 and the valve opening rate of the air pressure regulator 15.

To perform the above-mentioned processes, the ECU 50 receives signals from various sensors which detect the operational state of the fuel cell system 1. The sensors include, for example, an air flow rate sensor 11, a voltage sensor 16, and a temperature sensor 17 which serves as temperature detecting means.

The air flow rate sensor 11 detects the flow rate of the air which flows through the oxidant-gas supply pipe 12.

The voltage sensor 16 detects the voltage of the fuel cell stack 2. The voltage sensor 16 detects the voltage (potential difference between the fuel electrode and the oxidant electrode) of each of the power generation cells included in the fuel cell stack 2. Alternatively, the power generation cells may be grouped into a plurality of cell units which serve as detection units, and the voltage sensor 16 may detect the voltage of each of the cell units. Alternatively, the voltage sensor 16 may also detect the output voltage of the overall fuel cell stack 2.

The temperature sensor 17 detects the temperature of the fuel cell stack 2. The temperature sensor 17 detects the temperature of each of the power generation cells included in the fuel cell stack 2. Alternatively, the power generation cells may be grouped into a plurality of cell units which serve as detection units, and the temperature sensor 17 may detect the temperature of each of the cell units. The temperature of the fuel cell stack 2 may, for example, be determined as the highest of the temperatures detected by temperature sensors attached the power generation cells individually. Alternatively, a single temperature sensor may be attached to a representative power generation cell in the fuel cell stack 2. In the case where only one temperature sensor is provided, the temperature sensor is preferably disposed in a central area of the fuel cell stack 2 where the temperature is easily increased, that is, where the fuel cell stack 2 is not easily cooled.

In the present embodiment, hydrogen is used as the fuel gas and air containing oxygen is used as the oxidant gas. The fuel cell system 1 is mounted in, for example, a vehicle and is used as a power source of an electric motor for driving the vehicle.

The performance recovery operation performed for recovering the performance of the fuel cell stack included in the fuel cell system will now be described.

Figure 3:
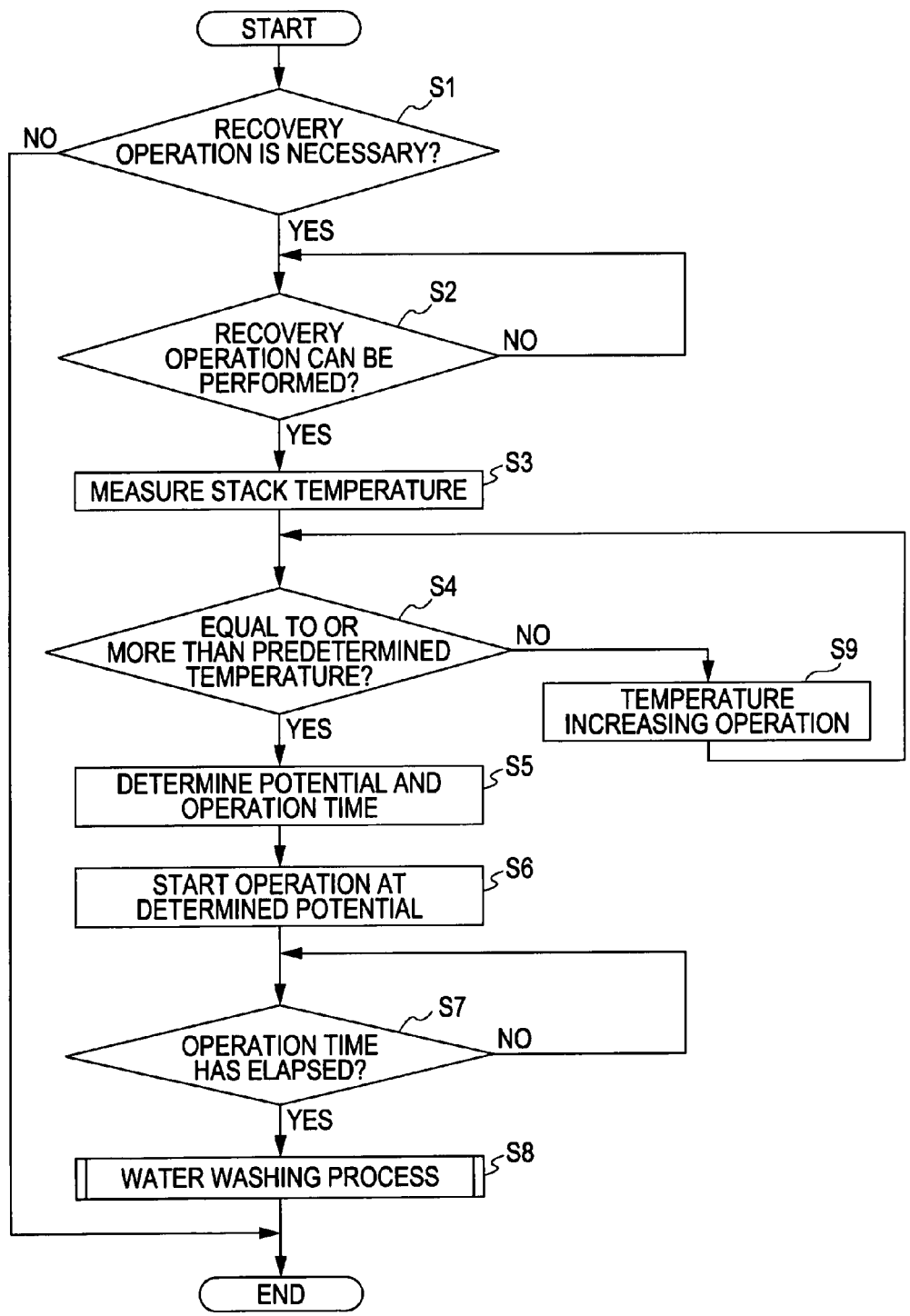
FIG. 3 is a flowchart of a control sequence of a characteristic recovery operation.

FIG. 3 is a flowchart of a control sequence of the characteristic recovery operation. First, the overall control sequence will be described, and then each step (process) will be described in detail.

The ECU 50 first determines whether or not the characteristic recovery operation is necessary in step S1 (determining means). Then, the ECU 50 determines whether or not it is possible to perform the characteristic recovery operation in step S2. If it is determined that it is possible to perform the recovery operation, the ECU 50 measures the temperature of the fuel cell stack 2 in step S3. If the measured temperature is equal to or more than a predetermined temperature (Yes in step S4), the ECU 50 determines a potential to be set in the recovery operation and the operation time for which the potential is to be maintained in step S5. Then, the ECU 50 performs the recovery operation at the determined potential, the determined operation time, and the current temperature in step S6. Then, when it is determined that the operation time has elapsed (Yes in step S7), the ECU 50 performs a water washing process for washing away the oxidized impurities in step S8. Thus, the recovery operation is completed.

Each of the steps will now be described in detail.

In step S1, it is determined whether or not the characteristic recovery operation is necessary based on one or more of the following criteria.

(1) Whether or not an accumulated operation time of the fuel cell system is longer than a predetermined time.

In the case where this criterion is used, the ECU 50 calculates the accumulated operation time of the fuel cell using a timer (not shown) included in the ECU 50. Whether or not to perform the recovery operation is determined on the basis of the accumulated operation time. In this case, the timer and the ECU 50 function as an accumulated operation-time keeping means.

In the fuel cell, the impurities tend to accumulate as the operation time increases. Therefore, the operation time may be used as a criterion for determining whether or not to perform the recovery operation. If the recovery operation is performed when the operation time reaches a certain time, the performance degraded by the impurities can be recovered within a certain range.

The characteristic recovery operation may be performed when the accumulated operation time of the fuel cell reaches a certain time that is determined in accordance with the environment in which the fuel cell system is used. For example, in the case where the fuel cell system is mounted in a vehicle, the time may be set to about 50 hours on the basis of the yearly driving time. Accordingly, the recovery operation is periodically performed in accordance with the driving time. However, the predetermined time is not limited to the above-mentioned time. For example, the predetermined time may be reduced in the case where the vehicle often drives in an area where large amounts of pollutants are in the atmosphere, and may be increased in the area where the atmosphere is clean.

(2) Whether or not an amount of reduction in the voltage of each power generation cell or each power generation cell unit detected by the voltage sensor 16 is larger than a predetermined value.

The amount of reduction in the voltage of each power generation cell or each power generation cell unit is a voltage reduction caused in each of the power generation cells or in each of the power generation cell units when the fuel cell is operated under a certain load. Here, the power generation cell units are units obtained by integrating a plurality of power generation cells. The characteristic recovery operation may be performed when the amount of reduction in the voltage of each power generation cell or each power generation cell unit reaches a value that is determined in accordance with, for example, the performance of the fuel cell. More specifically, for example, it is assumed that when the power generation performance of the fuel cell is not yet degraded (or when the previous recovery operation has just been performed) and the fuel cell output is 100%, the voltage of each power generation cell or each power generation cell unit is 1 V. In this case, it can be determined that the recovery operation is necessary when the voltage of each power generation cell or each power generation cell unit is reduced to 0.95 V. In other words, the criterion for determining whether or not the recovery operation is necessary may be set to a reduction of 5%. Although the criterion is not limited to the above-mentioned value, it is preferable that the criterion be set within a range such that stable operation can be continuously performed.

In the case where the necessity of the recovery operation is determined on the basis of the reduction in the voltage, the performance degraded by the impurities can be easily and reliably recovered.

(3) Whether or not an accumulated operation time of the fuel cell system in a specific operation mode is longer than a predetermined time.

In the case where polymer electrolyte is used as the electrolyte of the fuel cell, the specific operation mode is set to an operation mode in which the degradation easily occurs, and the accumulated operation time in the specific operation mode is detected by the time included in the ECU 50. In this case, the timer and the ECU 50 function as an accumulated operation-time keeping means for the specific operation mode.

The operation mode in which the degradation of the polymer electrolyte easily occurs is, for example, an operation mode in which the fuel cell is set to a high-voltage state. The high-voltage state is the state in which the voltage of each power generation cell or each power generation cell unit is 0.8 V or more. If there is another operation mode in which the impurities that cause the degradation of the fuel cell are easily generated, such an operation mode may, of course, also be set as the specific operation mode. In such a case, operation times may be accumulated individually for the respective operation modes.

Since the degree of degradation of the fuel cell differs in accordance with the operation mode thereof, the amount of accumulation of the impurities differs depending on the operation history. Therefore, the recovery operation may be performed when the accumulated operation time for the specific operation mode (in particular, idle operation mode) in which the degradation easily occurs reaches a predetermined value. In such a case, the performance degraded by the impurities can be recovered to be within a certain range.

The determination criteria (1) to (3) may be selectively used. Alternatively, the characteristic recovery operation may be performed only when two or more of the determination criteria (1) to (3) are satisfied.

Since parameters such as time and voltage are used as the criteria for determining the necessity of the recovery operation, it can be easily determined whether or not the recovery operation is necessary without complicating the overall system. According to the present embodiment, the characteristic recovery operation is performed when it is determined that the characteristic recovery operation is necessary on the basis of the above-described criteria. However, the characteristic recovery operation may also be performed periodically at a predetermined timing, for example, when the fuel cell is activated or stopped.

There are two major causes of generation of the impurities which cause the degradation of the power generation performance of the fuel cell. According to one of the two major causes, the impurities are generated in the fuel cell.

More specifically, to generate power with the fuel cell, it is necessary that the polymer electrolyte membrane be impregnated with water. Therefore, the inside of the fuel cell is constantly in the wet state. Therefore, when the fuel cell is operated for a long time, ionic impurities and inorganic impurities are dissolved into the water in the cell from materials such as sealing material, resin material, and metal material from components within the fuel cell. In addition, in the case where the fuel cell is mounted on a vehicle, a plurality of different operation modes are used in complex combination. Therefore, if the fuel cell is operated for a long time, the polymer electrolyte membrane will be degraded and decomposition products, which serve as impurities, will be generated accordingly.

According to the other one of the two major causes, the impurities are brought into the fuel cell from the outside. In general, the outside air is used as the oxidant gas in the fuel cell. The air supplied from the outside contains atmospheric pollutants such as sulfur oxides, hydrogen sulfide, and nitrogen oxides. Some countries have environmental standards designed to limit such pollutants, but the standards are often exceeded. For example, according to the environmental standards in Japan, the limit of sulfur compound concentration is 0.04 ppm. However, if the fuel cell is mounted in a vehicle which drives on heavy-traffic roads for a long time, there is a possibility that the concentration of sulfur oxides in the air supplied to the oxidant electrode will be higher than the above-mentioned limit. In addition, depending on the type of gas that is used as the fuel gas, there is also a possibility that impurities such as carbon monoxide and sulfur compounds will enter the fuel cell.

The impurities move into the catalyst layers and the electrolyte membrane, and cause a reduction in the power generation performance of the fuel cell as follows.

(1) Poisoning of Catalyst.

As is well known, sulfur compounds are strongly adsorbed by a platinum surface which is used as the catalyst metal surface in the fuel cell. The adsorption of sulfur on the catalyst metal surface causes a reduction in the number of active sites of the catalyst, which interferes with the reaction occurring at the catalyst metal surface. Consequently, the power generation performance of the fuel cell is reduced. It is necessary to increase the electrode potential to remove the sulfur species adsorbed on the catalyst metal surface.

(2) Reduction in Ion Conductivity of Electrolyte.

The impurity cations (positive ions), such as metal ions, become bonded to the ion exchange groups in the electrolyte membrane and thereby reduce the ion conductivity of the electrolyte. As a result, the resistance of the electrolyte increases and the power generation performance is reduced.

(3) Reduction in Mass Transfer Characteristics of Electrolyte.

When the impurities accumulate in the electrolyte, mass transfer characteristics of reactive gas, water, etc., in the electrolyte are reduced. Therefore, the overvoltage is increased and the power generation performance is reduced.

In the above-described determination performed in step S1, the degree of accumulation of the impurities is estimated from the operation time or the voltage, and it is determined whether or not the recovery operation is necessary.

If the ECU 50 determines that the characteristic recovery operation is not necessary in step S1, the characteristic recovery operation is ended.

If the ECU 50 determines that the characteristic recovery operation is necessary on the basis of one or more of the criteria (1) to (3) in step S1, the ECU 50 proceeds to step S2. In step S2, the ECU 50 determines whether or not it is possible to perform the characteristic recovery operation of the fuel cell stack 2. In the case where the fuel cell is mounted in a vehicle, the characteristic recovery operation is preferably performed while the vehicle is stopped and the load applied to the fuel cell is extremely small, as in the idling state. This is because it is necessary to change the operational state of the fuel cell in the recovery operation irrespective of the load applied to the fuel cell.

If it is determined that it is possible to perform the characteristic recovery operation of the fuel cell stack 2 in step S2, a process of maintaining the potential of the oxidant electrode in the fuel cell stack 2 at a high potential is performed as a first step of characteristic recovery operation. The potential of the oxidant electrode is maintained at a high potential for the purpose of oxidizing the impurities on a catalyst surface. If it is determined that it is not possible to perform the characteristic recovery operation of the fuel cell stack 2 in step S2, step S2 is repeated until the state in which the characteristic recovery operation can be performed is established.

If the state in which the characteristic recovery operation can be performed is established, the ECU 50 proceeds to step S3. In step S3, the temperature of the fuel cell stack 2 is measured to determine whether or not a temperature condition under which the oxidation of the impurities can be promoted is satisfied. Then, in step S4, it is determined whether or not the detected temperature of the fuel cell stack 2 is equal to or higher than a predetermined temperature at which the impurities can be oxidized. If the temperature of the fuel cell stack 2 is equal to or higher than the predetermined temperature at which the impurities can be oxidized, the ECU 50 proceeds to step S5 in which it determines the potential and the operation time for which the potential is to be maintained. If the temperature is less than the predetermined temperature, the ECU 50 proceeds to step S9 in which it performs the process of increasing the temperature of the fuel cell stack 2. A temperature control apparatus is used to raise the temperature of the fuel cell stack 2 to the predetermined temperature. This process will be described in detail below.

Expression 1 shows the oxidization reaction of an impurity on the catalyst surface when the potential is maintained at a high potential. Expression 1 shows the case in which a sulfur compound, which is a typical impurity, is on the catalyst surface. As is clear from Expression 1, the oxidation of the impurity is an electrochemical reaction.

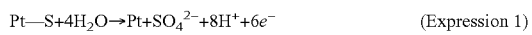

$$Pt\text{—}S+4H_2O \rightarrow Pt+SO_4^{2-}+8H^++6e^- \quad \text{(Expression 1)}$$

Since the oxidation reaction is an electrochemical reaction, the reaction strongly depends on the potential. The relationship between the oxidation of the impurity, the temperature, and the potential will now be described with reference to experimental results.

An experiment was performed in which a platinum surface of the oxidant-electrode catalyst layer was poisoned by supplying $SO_2$, and then the platinum surface area ratio was measured while maintaining the potential at different values. When the oxidization of sulfur occurs in accordance with the reaction of Expression 1, the strong bond between Pt and S breaks and the number of reaction sites on the platinum surface increases. Therefore, the increase in the platinum surface area ratio can be considered an index of oxidization of the impurity. The details of the experiment will be described below.

Figure 4:
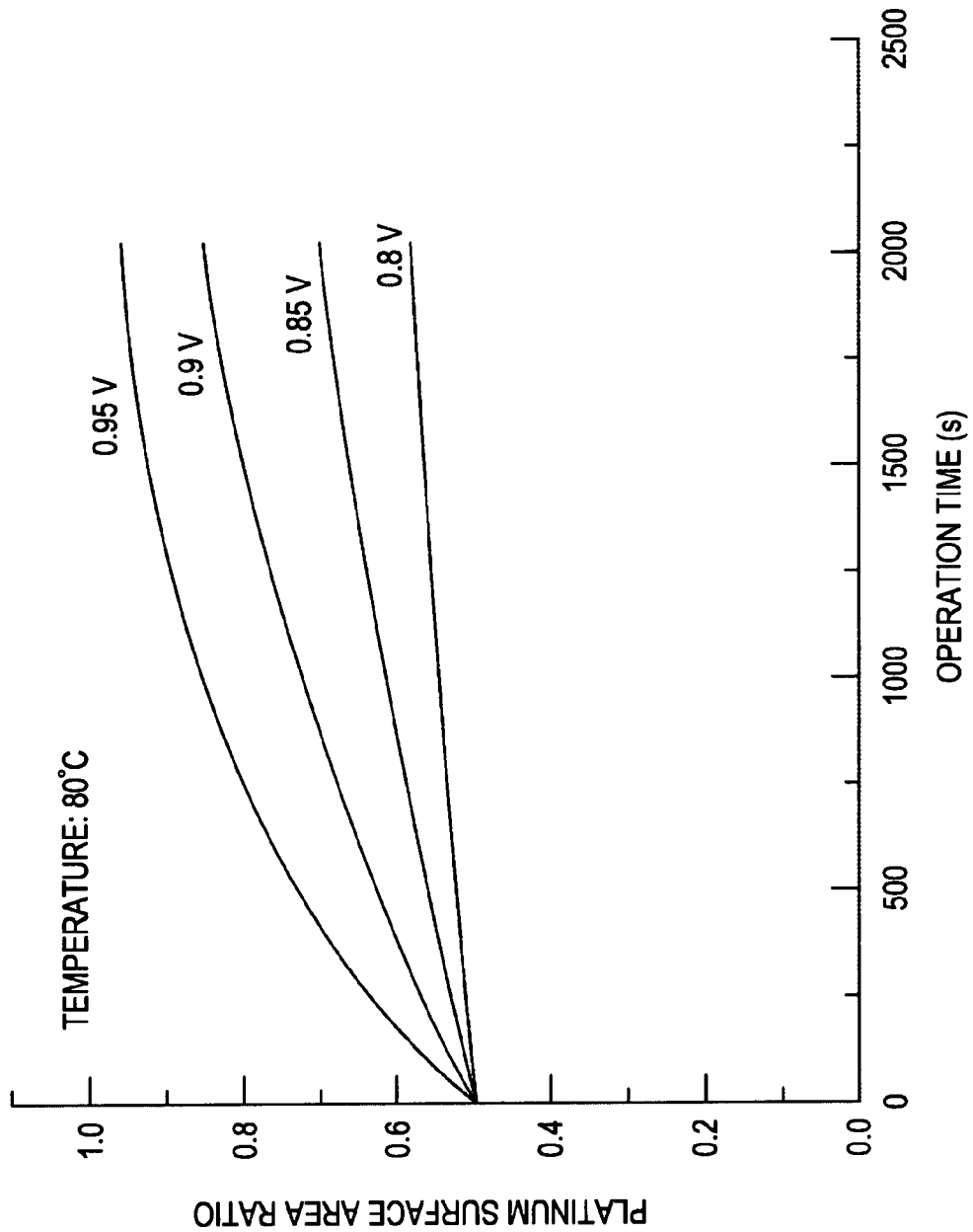
FIG. 4 is a graph showing the variation in the platinum surface area obtained by measuring the platinum surface area ratio while maintaining the potential at different values after a poisoning process.

FIG. 4 shows the variation in the platinum surface area ratio obtained by measuring the platinum surface area ratio while maintaining the potential at different values after the poisoning process. The horizontal axis shows the operation time for which the potential was maintained, and the vertical axis shows the recovery rate (0 to 1) of the platinum surface area ratio. It is clear from FIG. 4 that the oxidation reaction is promoted as the potential is increased. However, if a high potential is maintained, the electrode is quickly degraded.

Figure 5:
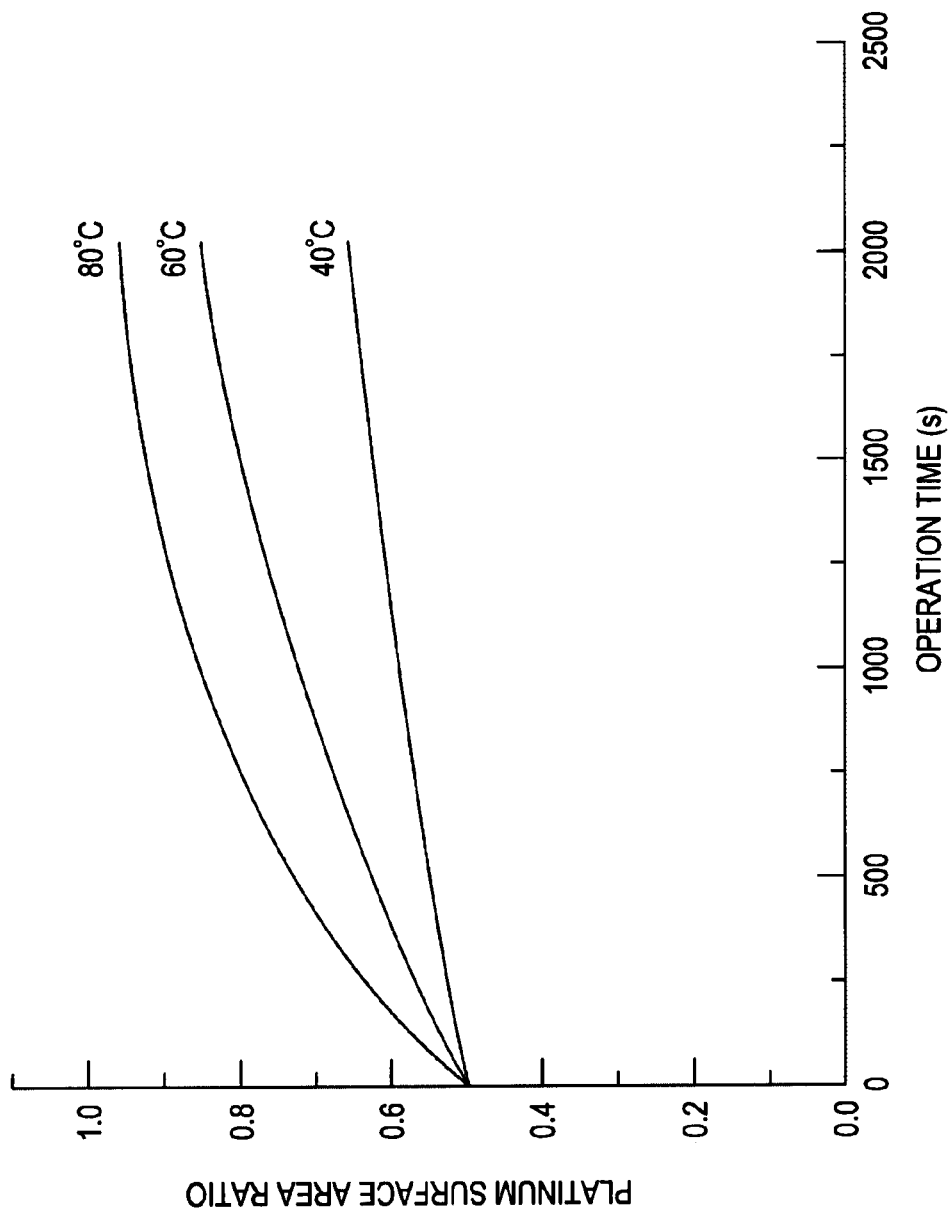
FIG. 5 is a graph showing the temperature sensitivity of the recovery of the platinum surface area after the poisoning process.

Therefore, an experiment for examining the relationship between the oxidization and the temperature was performed. FIG. 5 shows the temperature sensitivity of the recovery of the platinum surface area ratio after the poisoning process. The horizontal axis shows the operation time for which the potential was maintained, and the vertical axis shows the recovery rate (0 to 1) of the platinum surface area ratio. As the recovery rate approaches 1, the percentage of the recovery approaches 100%, that is, the state of the platinum surface becomes closer to the original state.

It is clear from FIG. 5 that the oxidization reaction is promoted as the temperature increases and the time required for obtaining a certain recovery effect differs depending on the temperature. In addition, it is also clear that the oxidation slowly occurs when the temperature is equal to or less than about 40° C.

From the experiment results shown in FIGS. 4 and 5, it was found that if the temperature, the potential, and the operation time for which the temperature and the potential are maintained are adequately selected, the characteristics of the electrode can be recovered without maintaining a high potential for a long time.

Figure 6:
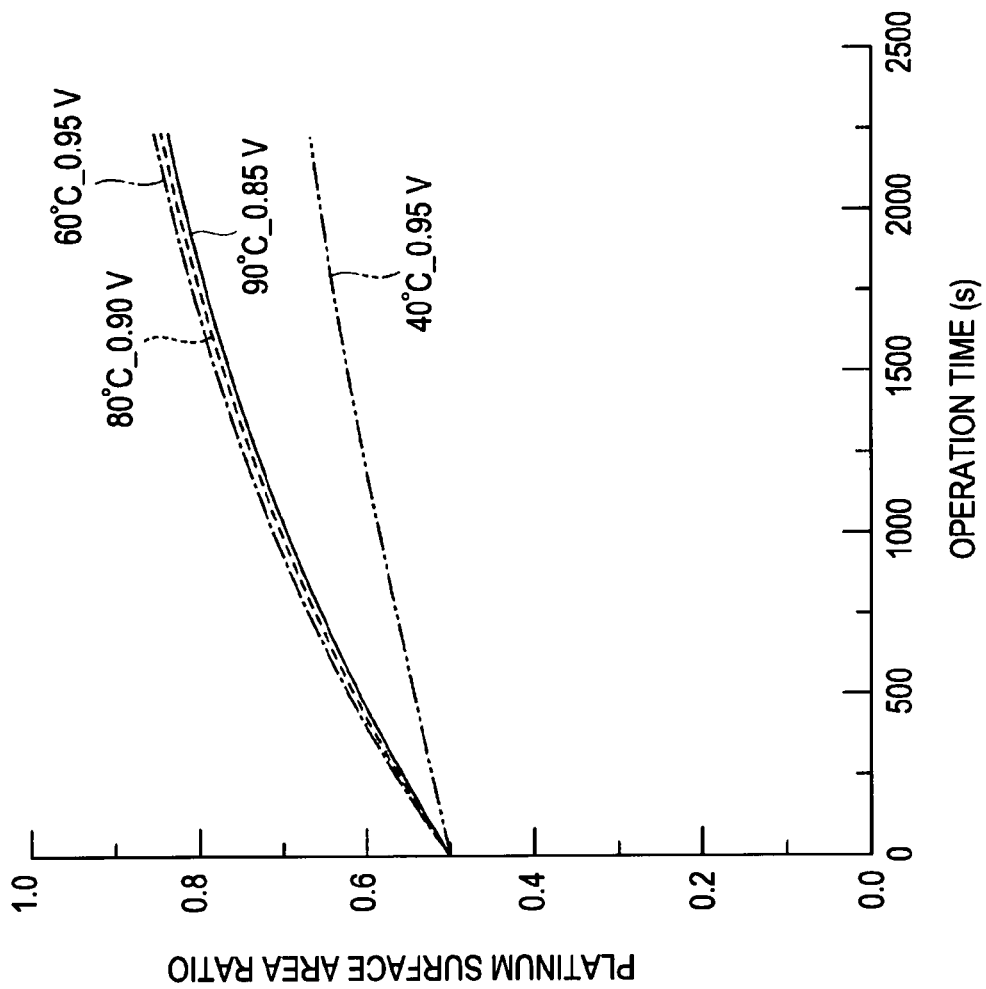
FIG. 6 is a graph showing the variation in the platinum surface area ratio with respect to the temperature, the potential, and the operation time for which the temperature and potential are maintained.

FIG. 6 is a graph showing the variation in the platinum surface area ratio with respect to the temperature, the potential, and the operation time for which the temperature and the potential are maintained.

It is clear from FIG. 6 that if the temperature is 60° C. or more, the electrode performance can be recovered within substantially the same operation time irrespective of the temperature and the potential. When the temperature is 80° C., the electrode performance can be recovered at 0.9 V. When the temperature is 90° C., the electrode performance can be recovered at 0.85 V. Thus, if the temperature is high, the impurity can be oxidized within the same operation time even when the potential is low.

The relationship between the temperature, the potential, and the operation time shown in the graph in FIG. 6 is stored in the ECU 50 in advance. Accordingly, the ECU 50 can determine the minimum potential and the operation time required for the recovering the performance of the fuel cell at the measured temperature on the basis of the stored data.

The predetermined temperature used in step S4 may be determined from the graph shown in FIG. 6. For example, according to the graph shown in FIG. 6, when the temperature is 40° C., the performance cannot be satisfactorily recovered even if the potential is set to about 0.95 V for a long operation time. When the temperature is 60° C., the performance can be recovered by setting the potential to 0.95 V. However, this is not preferable because a high potential must be maintained. In contrast, if the temperature is 80° C., even when the potential is set to 0.9 V, the recovery percentage can be increased to 80% within substantially the same operation time as those in the cases of other temperatures. Therefore, the predetermined temperature is preferably set to about 70° C. to 80° C.

Here, the relationship between the temperature and the potential required to recover the platinum surface area ratio (that is, catalyst performance) to a certain recovery percentage, under the condition that the operation time for which the potential is maintained constant, will be considered. In this case, as the temperature increases, the potential required to achieve the recovery percentage decreases. In addition, according to the relationship between the potential and the temperature for recovering the catalyst to a certain recovery percentage under the condition that the operation time for which the potential is maintained is constant, the potential largely increases when the temperature is 60° C. or less. Therefore, as described above, the predetermined temperature is preferably in the range of about 70° C. to 80° C.

Therefore, if the temperature is high, the recovery control operation can be performed without causing the problems of degradation of the electrolyte membrane and elution of the catalyst metal by performing the recovery control operation at a low potential. If the temperature is below the predetermined temperature, the recovery control operation cannot be suitably performed, or the potential for the recovery control operation must be set to a high potential. Therefore, if the temperature of the fuel cell is less than the predetermined temperature, the recovery control operation is performed after increasing the temperature of the fuel cell to a temperature that is equal to or higher than the predetermined temperature. Thus, the recovery control operation can be performed without causing the problems of degradation of the electrolyte membrane and elution of the catalyst metal.

The predetermined temperature differs depending on the structure and the size of the fuel cell stack, the electrode structure, etc., and is suitably set in accordance with these factors. Therefore, according to the present invention, the predetermined temperature is not particularly limited.

The method of the experiment of FIG. 4 will now be described. For the experiment, a small cell unit having an active area of 25 cm² was prepared. A platinum/carbon (Pt/C) catalyst was used as each of the fuel-electrode (anode) catalyst and the oxidant-electrode (cathode) catalyst. In the experiment, the potential was controlled using a potentiostat.

In the experiment, the cell temperature was set to 80° C. Hydrogen (100% relative humidity or RH) was supplied to the fuel electrode at 0.5 nanoliters per minute (NL/min), and nitrogen gas containing 2 ppm of $SO_2$ was supplied to the oxidant electrode at 0.5 NL/min. The potential of the oxidant electrode was maintained at 0.5 V for 2 hours to poison the oxidant-electrode catalyst with $SO_2$. After the poisoning process, the gas supplied to the oxidant electrode was changed to pure nitrogen, and the potential at the oxidant electrode was maintained at a certain potential. Then, the variation in the platinum surface area ratio with time due to the oxidization and removal of the impurity was observed. The result of this experiment is shown in FIG. 4. In FIG. 4, the vertical axis shows the ratio of the platinum surface area ratio, where the initial platinum surface area ratio before the poisoning process is 1, and the horizontal axis shows the operation time for which each potential was maintained.

In the experiment of FIG. 5, the process of poisoning the oxidant electrode was performed under the same conditions as those in the experiment of FIG. 4. Then, the electrode potential was maintained at 0.95 V while the cell temperature was set at each of the temperatures shown in FIG. 5, and the variation in the platinum surface area ratio with time was observed. The type, the flow rate, and the humidity of the gasses supplied to the electrodes were the same as those in the experiment of FIG. 4. In FIG. 5, the vertical axis shows the platinum surface area ratio with respect to the initial area, and the horizontal axis show the operation time for which the potential was maintained.

Referring to the flowchart of FIG. 3 again, after the potential and the operation time are determined in step S5, the operation is started at the determined potential in step S6. In this operation, the temperature is preferably maintained at the measured temperature. In general, the temperature increases while the power is being generated by the fuel cell. However, since the characteristic recovery operation is not adversely affected by the increase in temperature, the cooling process performed by the cooling device can be continued. Conversely, in the operation of maintaining the potential, since the load is reduced to maintain a high potential and the amount of power generation is considerably reduced, there may be a case in which the amount of heat generation will be reduced. For example, the amount of heat generation will be reduced when the environmental temperature is low. In such a case, the temperature gradually decreases with time. Therefore, the cooling power of the cooing device may be reduced (similar to the temperature increasing process performed in step S9 described below).

The power generation voltage of the fuel cell can be controlled by controlling the load applied to the fuel cell. The power generation voltage can be determined by measuring the voltages of the individual power generation cells (or the power generation cell units) with the voltage sensor 16.

In the state in which power is generated by the fuel cell, the potential is generally reduced to about 0.5 V. In contrast, the fuel cell can be operated at the determined potential (about 0.85 V to 0.9 V in the case of FIG. 6) by controlling the load applied to the fuel cell. For example, the fuel cell can be operated at the determined potential by setting a state in which the load is in the range of substantially 0% (no-load state) to about 20%.

In the case where the fuel cell is mounted in a vehicle, the above-described state can be obtained by changing the amount of power supplied to a motor, which serves as a loading device, in an idling operation (operation in which the vehicle does not move). Alternatively, in the case where the fuel cell is not used in the vehicle but is used as, for example, a household power source, the low-load operation can be performed when the power usage is at a minimum, for example, at midnight.

In addition, in the case where a secondary battery is provided as an auxiliary power source in the vehicle or the household power source, a certain amount of load can be applied while maintaining the low-load state by controlling the amount of charge of the secondary battery. For example, in the fuel cell system mounted in the vehicle, even if the load required of the fuel cell system by the vehicle is too low, the potential can be maintained at the determined potential by performing a control process for charging the secondary battery. Alternatively, to apply a certain amount of load, an electric component mounted in the vehicle may be turned on or a dedicated resistor for generating a low load may be prepared in advance. Thus, the load may be applied by various methods, and the method for applying the load is not particularly limited.

After the operation is started in which the potential is maintained, it is determined whether or not the operation time has elapsed in step S7. If the operation time has elapsed, the water washing process is performed in step S8. In the present embodiment, the water washing process is performed by increasing the amount of water in the catalyst layer.

FIG. 7 is a flowchart illustrating the process of increasing the amount of water in the catalyst layer (water washing subroutine).

In this example, the amount of water is increased by setting the air flow rate to a value lower than that in a normal operation, that is, in an operation in which recovery control is not performed.

In step S11, the ECU 50 starts the catalyst-layer water-content increasing process. More specifically, the ECU 50 monitors a value obtained by the air flow rate sensor 11, and controls the rotational speed of the compressor 10 and the valve opening rate of the air pressure regulator 15 such that the air flow rate is lower than that in the normal operation but is equal to or higher than a predetermined value. Thus, the amount of water in the catalyst layer is increased by way of a water supply apparatus (water supply means).

When the air flow rate is reduced, the amount of moisture taken away by the air flow decreases. Consequently, the amount of water in the catalyst layer can be increased. However, if the amount of air, which serves as the oxidant, is too small, an amount of oxygen required for generating the power cannot be obtained. Therefore, stable power generation cannot be performed. Therefore, according to the present embodiment, the air flow rate is reduced but is maintained equal to or higher than the predetermined value. The predetermined value of the air flow rate (lower limit of the air flow rate in the recovery operation) is preferably set to a minimum flow rate at which the power can be continuously generated in the recovery operation. This value differs depending on the factors such as the shape and arrangement of the pipes and the number of power generation cells included in the fuel cell stack 2 (that is, the air flow performance in the fuel cell stack 2). Therefore, the above-described predetermined value of the air flow rate is preferably determined by experiments so that the amount of water can be increased enough to remove the impurities in the catalyst layer and the power generation performance can be maintained at the same time.

In addition, in some cases, a humidifier is provided to humidify the air which serves as the oxidant. In the catalyst-layer water-content increasing process, the humidifier humidifies the air more than in the normal operation. As a result, the air humidified by a humidifier is reacted at the catalyst layer and the amount of water in the catalyst layer is increased.

Then, the ECU 50 determines whether or not a predetermined time has elapsed in step S12. If the predetermined time has elapsed since the reduction of the air flow rate, the catalyst-layer water-content increasing process is ended in step S13. If the time elapsed since the air flow rate was reduced and the power generation was started in step S12 is less than the predetermined time, the process waits until the predetermined time elapses.

Thus, the process is continuously performed for the predetermined time while the air flow rate is maintained at such a value that the amount of water in the catalyst layer can be increased enough to remove the impurities. Thus, the amount of water in the catalyst layer is increased and the impurities accumulating in the catalyst layer are removed. The predetermined value of the air flow rate is determined by experiments as described above. The operation time is also preferably determined by experiments because the desired operation time also differs depending on the factors such as the material of the catalyst layer and the manner in which the water is contained in the catalyst layer.

Then, when it is determined that the predetermined operation time has elapsed, the ECU 50 reduces the amount of water in the catalyst layer to the original amount in step S14. At the time when the catalyst-layer water-content increasing process is ended in step S13, the amount of water in the catalyst layer is larger than that in the normal state. Therefore, if a high-load operation is performed immediately after step S13, there is a risk that the gas will be blocked by the excess water and the catalyst layer will be degraded. Therefore, the amount of water in the catalyst layer is reduced to a value close to that in the normal operation. The amount of water in the catalyst layer can be reduced and the excess water can be eliminated by returning the air flow rate to that in a normal operation for a predetermined time, or by increasing the air flow rate for a predetermined time. Thus, the excess water can be eliminated and flooding can be prevented when the fuel cell is reactivated.

Thus, the sequence of the characteristic recovery operation is ended and the normal operation is restarted.

In the recovery operation, if a command for changing the low-load operation state to another state is input, for example, if a load trigger, such as an accelerator, is activated, it is preferable to follow the command instead of continuing the recovery control. In such a case, the electrode recovery operation can be performed without affecting, for example, the driving operation of the vehicle.

Next, the process of increasing the temperature performed in step S9 will be described.

The temperature increasing process is performed using a temperature control apparatus. In one embodiment, the temperature increasing process relies on reducing the cooling power of the cooling apparatus or cooling device (temperature increasing means). In the fuel cell, the heat of reaction is generally generated in the power generation operation, and heat is also generated due to the voltage loss. Therefore, if the flow rate of the coolant used in the cooling device is reduced or the circulation of the coolant is stopped, the temperature increases as the power generation operation continues. Of course, in the case where a heater is provided for increasing the temperature of the fuel cell or the coolant (not illustrated), the heater can be used to increase the temperature of the fuel cell.

Therefore, if the temperature is less than the predetermined temperature (for example, 40° C.) in step S4, the flow rate of the coolant is reduced by reducing the rotational speed of the pump 22 until the temperature reaches the predetermined temperature in step S9. Thus, the temperature of the fuel cell stack 2 can be increased. In addition, although not shown in the figure, in the case where a radiator for cooling the coolant is provided, the rotational speed of the radiator cooling fan can be reduced to suppress the reduction in the temperature of the coolant.

Due to the above-described embodiment, the impurities adsorbed and accumulated on the electrode are oxidized so that the impurities can be removed from the electrode, in particular, from the platinum surface. Then, the oxidized impurities are washed away. Thus, the impurities can be effectively removed. As a result, the power generation performance of the fuel cell stack 2, which is degraded due to the accumulation of the impurities, can be recovered.

In addition, according to the present embodiment, if the temperature of the fuel cell stack 2 is less than a predetermined temperature that is suitable for the potential at which the impurities can be oxidized, the temperature is increased. Therefore, it is not necessary to oxidize the impurities at a high potential close to that in a no-load state at a low temperature. In addition, the temperature is increased simply by reducing the cooling power of the cooling device included in the fuel cell. Therefore, the temperature can be increased by a control operation.

In addition, according to the present embodiment, the potential is set to the determined potential by controlling the amount of load. Therefore, the required electrode potential can be easily obtained by a control system similar to that used in the normal operation of the fuel cell system.

In addition, according to the present embodiment, the oxidized impurities are washed away by increasing the amount of water in the catalyst layer. Therefore, the impurities can be removed without adding a dedicated pipe or device in the fuel cell. Since the water washing process can be performed simply by controlling the air flow rate, the processes from the oxidation of the impurities to the water washing process can be continuously performed. Therefore, the impurities can be effectively removed.

In addition, the oxidized impurities can be washed away by reducing the air flow rate at the oxidant electrode 3b to increase the amount of water in the catalyst layer. Therefore, the processes from the oxidization of the impurities to the process of washing away the oxidized impurities can be performed without adding a dedicated pipe or device in the fuel cell.

The process of increasing the amount of water is not limited to the process of reducing the air flow rate at the oxidant electrode 3b. For example, the flow rate of the hydrogen gas at the fuel electrode 3a may also be reduced to reduce the amount of water taken away from the fuel-electrode catalyst layer. Also in this case, the water in the oxidant-electrode catalyst layer can be increased as a result.

Alternatively, the air flow rate and the flow rate of the hydrogen gas may both be reduced within the ranges of the flow rates necessary for generating the power at a low load. When the power generation is continuously performed, the water is continuously generated. At this time, if the flow rates of the air and hydrogen gas are reduced, the amount of water taken away by the air and hydrogen gas decreases. Therefore, the amount of water in the catalyst layer can be increased.

Although an embodiment of the present invention is described above, the present invention is not limited to the above-described embodiment.

For example, although the water washing process is performed after the oxidization of the impurities in the above-described embodiment, the water washing process may be omitted in an alternate embodiment. The impurities adsorbed on the platinum surface can be removed from the electrode material, such as platinum, by the oxidization thereof. Therefore, the electrode recovery effect can be obtained solely by the oxidization process. In addition, the impurities can be naturally washed away by the water generated in the normal operation of the fuel cell performed after the recovery operation. Therefore the effect of removing the impurities can be obtained even if the water washing process is not performed.

Conversely, the water washing process may be performed by forcibly injecting high-humidity gas, such as a mixture of air with water vapor having a relative humidity of 80%, from outside the fuel cell. In the case where the high-humidity gas is forcibly injected, the oxidized impurities can be washed away with a larger amount of water compared to the case in which the amount of water generated in the fuel cell is increased. In this case, the power generation operation of the fuel cell is preferably stopped while the high-humidity gas is being forcibly injected. In addition, after the washing process using the high-humidity gas is finished, it is necessary to send sufficient amount of air into the fuel cell and eliminate the excess water before the power generation operation is restarted.

In addition, according to the present invention, the process of increasing the amount of water in the catalyst layer may be started before the water washing process is started, for example, at the time when the operation at the determined potential is started in step S6. The oxidation of the impurities is generally promoted when there is a sufficient amount of water. Therefore, if the humidity in the fuel cell stack 2 is increased, the process of oxidizing the impurities can be promoted.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

What is claimed is:

1. A fuel cell system having at least one fuel cell including an oxidant electrode, a fuel electrode, and an electrolyte membrane interposed between the oxidant electrode and the fuel electrode, the fuel cell system comprising:
   a temperature detector which detects a temperature of the fuel cell; and
   a controller programmed to operate the fuel cell, control a potential of the oxidant electrode, and determine whether to perform a performance recovery operation in which an impurity on the oxidant electrode is oxidized;
   wherein, when the performance recovery operation is to be performed, the controller is programmed to operate the fuel cell while controlling the potential of the oxidant electrode to be a desired potential based on the temperature detected by the temperature detector.

2. The fuel cell system according to claim 1, wherein the desired potential of the oxidant electrode decreases as the detected temperature of the fuel cell increases.

3. The fuel cell system according to claim 1, further comprising:
   a temperature control apparatus which increases the temperature of the fuel cell;
   wherein the controller is programmed to control the temperature control apparatus to increase the temperature of the fuel cell to a predetermined temperature when the temperature detected by the temperature detector is lower than the predetermined temperature.

4. The fuel cell system according to claim 3, the temperature control apparatus comprising:
   a cooling apparatus for cooling the fuel cell;
   wherein the temperature control apparatus increases the temperature of the fuel cell by reducing the cooling of the cooling apparatus.

5. The fuel cell system according to claim 1, wherein the controller is programmed to control the potential of the oxidant electrode to the desired potential by changing an amount of power generation load applied to the fuel cell.

6. The fuel cell system according to claim 1, further comprising:
   a water supply apparatus which supplies water to the oxidant electrode;
   wherein the water supply apparatus increases an amount of water supplied to the oxidant electrode after the controller controls the potential of the oxidant electrode to the desired potential.

7. The fuel cell system according to claim 6, wherein the water supply apparatus increases the amount of water supplied to the oxidant electrode while power is being generated by the fuel cell.

8. The fuel cell system according to claim 6, wherein the water supply apparatus supplies high-humidity gas to at least one of the oxidant electrode and the fuel electrode in the fuel cell.

9. The fuel cell system according to claim 1, wherein the controller is programmed to set a time period for which the fuel cell is to be operated while the potential of the oxidant electrode is controlled to the desired potential, the time period being based on at least one of the desired potential and the detected temperature.

10. The fuel cell system according to claim 9, wherein the time period decreases as the detected temperature of the fuel cell increases.

11. The fuel cell system according to claim 1, wherein the controller is programmed to determine whether to perform the performance recovery operation based on at least one of an accumulated operation time of the fuel cell system being longer than a first predetermined time, a reduction in voltage output from the at least one fuel cell being larger than a predetermined value, and an accumulated operation time of the fuel cell system in a particular operation mode being longer than a second predetermined time.

12. A fuel cell system having at least one fuel cell including an oxidant electrode, a fuel electrode, and an electrolyte membrane interposed between the oxidant electrode and the fuel electrode, the fuel cell system comprising:
   temperature detecting means which detects a temperature of the fuel cell;
   control means programmed to operate the fuel cell and control a potential of the oxidant electrode; and
   determining means which determines whether to perform a performance recovery operation in which an impurity on the oxidant electrode is oxidized;
   wherein, when the performance recovery operation is to be performed, the control means is programmed to operate the fuel cell while controlling the potential of the oxidant electrode to be a desired potential based on the temperature detected by the temperature detector.

* * * * *